(12) United States Patent
Inoue et al.

(10) Patent No.: US 11,323,385 B2
(45) Date of Patent: May 3, 2022

(54) COMMUNICATION SYSTEM AND COMMUNICATION METHOD

(71) Applicant: Nippon Telegraph and Telephone Corporation, Tokyo (JP)

(72) Inventors: Satomi Inoue, Tokyo (JP); Masayuki Nishiki, Tokyo (JP); Takayuki Fujiwara, Tokyo (JP); Satoshi Nishiyama, Tokyo (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 84 days.

(21) Appl. No.: 16/967,967

(22) PCT Filed: Feb. 13, 2019

(86) PCT No.: PCT/JP2019/005048
§ 371 (c)(1),
(2) Date: Aug. 6, 2020

(87) PCT Pub. No.: WO2019/159952
PCT Pub. Date: Aug. 22, 2019

(65) Prior Publication Data
US 2020/0382439 A1  Dec. 3, 2020

(30) Foreign Application Priority Data
Feb. 14, 2018 (JP) .............................. JP2018-024535

(51) Int. Cl.
*H04L 12/917* (2013.01)
*H04L 12/911* (2013.01)
(Continued)

(52) U.S. Cl.
CPC ............ *H04L 47/76* (2013.01); *H04L 47/781* (2013.01); *H04L 47/801* (2013.01)

(58) Field of Classification Search
CPC ...... H04L 47/76; H04L 47/781; H04L 47/801
See application file for complete search history.

(56) References Cited

U.S. PATENT DOCUMENTS 10,931,793 B2 * 2/2021 Kumar ................ H04L 67/2842
2017/0104609 A1 * 4/2017 McNamee .............. H04L 63/06
(Continued)

OTHER PUBLICATIONS

Cloud.nifty.com, [online], "NIFCLOUD Auto Scale," Dec. 13, 2017, retrieved on Dec. 22, 2017. retrieved from URL<https://cloud.nifty.com/service/autoscale.htm>, 11 pages (with English Translation).

(Continued)

*Primary Examiner* — Hoang-Chuong Q Vu
(74) *Attorney, Agent, or Firm* — Fish & Richardson P.C.

(57) ABSTRACT

A communication system includes a flow collector that collects traffic of an NW edge accommodating CPE, an NFVO that provides an instruction to add or remove a resource of a VNF, a resource management device that notifies the NFVO of an increased or decreased resource amount and an addition or removal instruction of the VNF based on an increase or decrease of the traffic of the NW edge collected by the flow collector, and that decides on the VNF which becomes a redirection destination of the traffic of the NW edge in response to execution of addition or removal of the VNF by the NFVO, a VIM that adds or removes the VNF in accordance with an instruction from the NFVO, and a flow controller that instructs the NW edge to set the VNF decided by the resource management device as the redirection destination of the traffic.

5 Claims, 14 Drawing Sheets

(51) Int. Cl.
  *H04L 12/927*  (2013.01)
  *H04L 47/76*  (2022.01)
  *H04L 47/78*  (2022.01)
  *H04L 47/80*  (2022.01)

(56) References Cited

U.S. PATENT DOCUMENTS

| | | | |
|---|---|---|---|
| 2017/0223035 A1* | 8/2017 | Watanabe | H04L 63/0227 |
| 2017/0257276 A1* | 9/2017 | Chou | H04W 24/02 |
| 2017/0289270 A1* | 10/2017 | Li | H04L 41/12 |
| 2017/0353494 A1* | 12/2017 | Krinos | H04L 63/20 |
| 2018/0077590 A1* | 3/2018 | Sharma | H04W 24/08 |
| 2018/0191838 A1* | 7/2018 | Friedman | H04L 12/1403 |
| 2018/0227179 A1* | 8/2018 | Ding | G06F 9/45558 |
| 2019/0132211 A1* | 5/2019 | Yeung | H04L 41/0816 |
| 2019/0253930 A1* | 8/2019 | Senju | H04W 8/08 |
| 2020/0162323 A1* | 5/2020 | Abu Lebdeh | H04L 67/10 |
| 2021/0288827 A1* | 9/2021 | Celozzi | H04M 15/00 |

OTHER PUBLICATIONS

Microsoft.com, [online], "How to Configure Auto Scaling for a Cloud Service in the Portal," May 18, 2017, retrieved on Jan. 30, 2018, retrieved from URL<https://docs.microsoft.com/ja-jp/azure/cloud-services/cloud-services-how-to-scale-portal>, 10 pages (with English Translation).

* cited by examiner

| TRANSMISSION SOURCE IP ADDRESS | RECIPIENT IP ADDRESS | TRANSMISSION SOURCE MAC ADDRESS | RECIPIENT MAC ADDRESS | PROTOCOL NUMBER | TRAFFIC AMOUNT | HOW LARGE IN RANK | REDIRECTION VNF |
|---|---|---|---|---|---|---|---|
| X1 | Y1 | X1a | Y1a | Z1 | 800 | 1 | 22-1 |
| X2 | Y2 | X2a | Y2a | Z2 | 100 | 4 | 22-0 |
| X3 | Y1 | X3a | Y1a | Z3 | 400 | 3 | 22-1 |
| X4 | Y1 | X4a | Y1a | Z4 | 500 | 2 | 22-1 |
| ... | ... | ... | ... | ... | ... | ... | ... |

Fig. 3

| VNF | MAXIMUM RESOURCE AMOUNT (Ri) | INPUT TRAFFIC AMOUNT AT CERTAIN POINT IN TIME | VACANT RESOURCE AMOUNT |
|---|---|---|---|
| VNF22-0 | 400 (R0) | 300 | 100 |
| VNF22-1 | 400 (R1) | 200 | 200 |

Fig. 6

| VNF | MAXIMUM RESOURCE AMOUNT (Ri) | INPUT TRAFFIC AMOUNT AT CERTAIN POINT IN TIME | VACANT RESOURCE AMOUNT |
|---|---|---|---|
| VNF22-0 | 400 (R0) | 300 | 100 |
| VNF22-1 | 400 (R1) | 200 | 200 |

⇩

| VNF | MAXIMUM RESOURCE AMOUNT (Ri) | INPUT TRAFFIC AMOUNT AT CERTAIN POINT IN TIME | VACANT RESOURCE AMOUNT |
|---|---|---|---|
| VNF22-0 | 400 (R0) | 300 | 100 |
| VNF22-1 | 400 (R1) | 200 | 200 |
| VNF22-2 | 400 (R2) | 0 | 400 |

Fig. 9

| TIME | VNF22-0 | | | VNF22-1 | | | VNF22-2 | | | L5-1 |
|---|---|---|---|---|---|---|---|---|---|---|
| | MAXIMUM RESOURCE AMOUNT | INPUT TRAFFIC AMOUNT AT CERTAIN POINT IN TIME | VACANT RESOURCE AMOUNT | MAXIMUM RESOURCE AMOUNT | INPUT TRAFFIC AMOUNT AT CERTAIN POINT IN TIME | VACANT RESOURCE AMOUNT | MAXIMUM RESOURCE AMOUNT | INPUT TRAFFIC AMOUNT AT CERTAIN POINT IN TIME | VACANT RESOURCE AMOUNT | |
| T1 | 400 | 300 | 100 | ... | ... | ... | ... | ... | ... | |
| T2 | 400 | 500 | ▲100 | ... | ... | ... | ... | ... | ... | |
| T3 | 800 | 500 | 300 | ... | ... | ... | ... | ... | ... | |
| ... | ... | ... | ... | | | | | | | |

Fig. 12

COMMUNICATION SYSTEM AND COMMUNICATION METHOD

CROSS-REFERENCE TO RELATED APPLICATIONS

This application is a National Stage application under 35 U.S.C. § 371 of International Application No. PCT/JP2019/005048, having an International Filing Date of Feb. 13, 2019, which claims priority to Japanese Application Serial No. 2018-024535, filed on Feb. 14, 2018. The disclosure of the prior application is considered part of the disclosure of this application, and is incorporated in its entirety into this application

TECHNICAL FIELD

The present disclosure relates to a communication system and a communication method.

BACKGROUND ART

In recent years, network function virtualization (NFV) that implements functions on commoditized general-purpose hardware by implementing a network technology using software has been widely used. Virtual network function (VNF) products in which functions provided by dedicated hardware are re-implemented using software in order to enable low cost implementation of flexible network design using NFV have become available on the market. In NFV, an autoscaling technology based on a network function virtualization orchestrator (NFVO) has already been established (refer to Non-Patent Literatures 1 and 2).

CITATION LIST

Non Patent Literature

Non-Patent Literature 1: Autoscaling of Nifcloud, [online], [searched on Jan. 30, 2018], Internet <URL: https://cloud.nifty.com/service/autoscale.htm>
Non-Patent Literature 2: Microsoft Azure, [online], [searched on Jan. 30, 2018], Internet <URL: https://docs.microsoft.com/ja-jp/azure/cloud-services/cloud-services-how-to-scale-portal>

SUMMARY OF THE INVENTION

Technical Problem

In such an autoscaling technology, the NFVO that is a higher-level device measures an increase or decrease of an input traffic amount of the VNF of an autoscaling target and performs autoscaling based on the increase or decrease.

FIG. 14 is a diagram describing a flow of autoscaling of the VNF by the NFVO in a technology in the related art. As illustrated in FIG. 14, for example, on a transport network (network: NW), a communication system in the related art includes a flow collector 30P, an NFVO 50P, a virtual infrastructure management (VIM) 60P, and a flow controller 70P above a traffic analysis NW. A VNF 22-0P of the traffic analysis NW is a CL edge such as a data center. A VNF 22-1P is an edge for redirecting attack traffic, and is a VNF edge of an autoscaling target of the NFVO 50P.

The flow collector 30P collects traffic of NW edges 12-1P to 12-NP that accommodate customer-premises equipment (CPE) 11-1P to CPE 11-NP, respectively (refer to (1) of FIG. 14). For example, a case where the CPE 11-1P is an attack terminal and traffic from the CPE 11-1P is rapidly increased in a small amount of time will be described. In this case, the flow collector 30P detects an attack of the CPE 11-1P based on a traffic collection result (refer to (2) of FIG. 14) and notifies the flow controller 70P of the attack (refer to (3) of FIG. 14).

The flow controller 70P instructs the NW edges 12-1P to 12-NP to redirect traffic to the VNF 22-0P, which is the CL edge for normal traffic, and the VNF 22-1P, which is the edge for redirecting attack traffic (refer to (4) of FIG. 14). Consequently, normal traffic is redirected to the VNF 22-0P, and attack traffic is redirected to the VNF 22-1P.

The NFVO 50P monitors a traffic amount of each of the VNFs 22-0P and 22-1P (refer to (5) of FIG. 14). In a case where the NFVO 50P detects insufficiency of a resource amount in the VNF 22-1P (refer to (6) of FIG. 14), the NFVO 50P instructs the VIM 60P to add a resource (refer to (7) of FIG. 14). Consequently, the VIM 60P adds a resource (refer to (8) of FIG. 14) and adds a VNF 22-2P.

In the communication system in the related art, a detection point of an increase in traffic by the NFVO 50P is the VNF 22-1P of the autoscaling target (refer to (A) of FIG. 14). In other words, the NFVO 50P decides a resource amount to be increased or decreased using the input traffic amount of the VNF 22-1P of the autoscaling target element. Thus, in the communication system in the related art, in a case where a rapid increase in traffic to the VNF 22-1P occurs in a small amount of time, it takes time to add the new VNF 22-2P to which an optimal resource amount is allocated, and it is difficult to immediately build a VNF corresponding to the rapid increase in traffic. Thus, when the new VNF 22-2P is necessary, that is, before a large amount of traffic is redirected (refer to (B) of FIG. 14), it is desirable to add a VNF with an appropriate resource amount.

The present disclosure is conceived in view of the above matter, and an object of the present disclosure is to provide a communication system and a communication method for efficiently building a VNF to which an optimal NW resource amount is allocated, depending on a change of a traffic amount flowing into an NW.

Means for Solving the Problem

In order to solve the above problem and accomplish the object, a communication system according to the present disclosure is a communication system having a VNF of identifying traffic by redirecting the traffic. The communication system includes a flow collector that collects traffic of an edge device accommodating an edge terminal, an NFVO that provides an instruction to add a resource of the VNF or remove the resource, a resource management device that notifies the NFVO of an increased or decreased resource amount and an addition or removal instruction of the VNF based on an increase or decrease of the traffic of the edge device collected by the flow collector, and that decides on the VNF which becomes a redirection destination of the traffic of the edge device in response to execution of addition of the VNF or removal of the VNF by the NFVO, a VIM that adds or removes the VNF in accordance with an instruction from the NFVO, and a flow controller that instructs the edge device to set the VNF decided by the resource management device as the redirection destination of the traffic.

Effects of the Invention

According to the present disclosure, a VNF to which an optimal NW resource amount is allocated is efficiently built depending on a change of a traffic amount flowing into an NW.

BRIEF DESCRIPTION OF DRAWINGS

FIG. 3 is a diagram showing an example of a data configuration of traffic data stored in a flow collector database (DB).

FIG. 6 is a diagram showing an example of a data configuration of resource data stored in an NFVO DB.

FIG. 9 is a diagram showing an update of the resource data by the NFVO illustrated in FIG. 1.

FIG. 12 is a diagram showing an example of a data configuration of resource data stored in the NFVO illustrated in FIG. 1.

DESCRIPTION OF EMBODIMENTS

Figure 1:
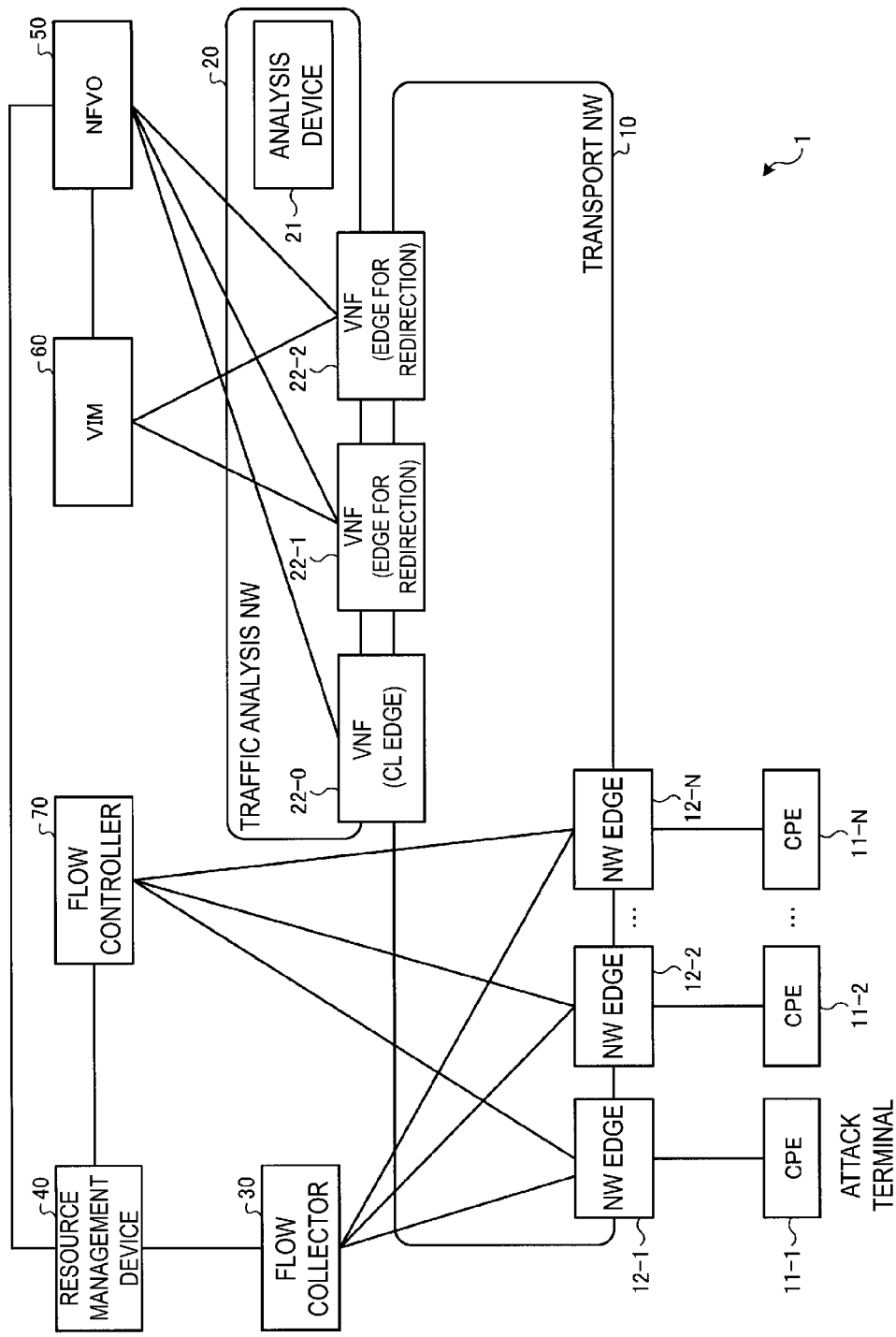
FIG. 1 is a diagram illustrating an example of a configuration of a communication system in an embodiment.

Hereinafter, an embodiment of the present disclosure will be described in detail with reference to the drawings. It is to be noted that the present disclosure is not limited to the embodiment. In addition, the same parts in the drawings are denoted by the same reference signs.

Embodiment

The embodiment of the present disclosure will be described. FIG. 1 is a diagram illustrating an example of a configuration of a communication system in the embodiment.

As illustrated in FIG. 1, on a transport NW, a communication system 1 according to the embodiment includes a flow collector 30, a resource management device 40, an NFVO 50, a VIM 60, and a flow controller 70 above a traffic analysis NW. The devices are connected to each other through a network or the like.

A transport NW 10 includes NW edges 12-1 to 12-N (edge devices) that accommodate CPE 11-1 to CPE 11-N (edge terminals), respectively. In a case where the plurality of CPE are collectively referred to without distinction therebetween, the plurality of CPE will be simply referred to as CPE 11. In addition, the number of CPE 11 is not limited to a number illustrated in FIG. 1. In a case where the plurality of NW edges are collectively referred to without distinction therebetween, the plurality of NW edges will be simply referred to as an NW edge 12. In addition, the number of NW edges 12 is not limited to a number illustrated in FIG. 1.

A traffic analysis NW 20 includes an analysis device 21, a VNF 22-0 (CL edge) redirecting normal traffic, and also VNFs 22-1 and 22-2 (edge for redirection) redirecting attack traffic. Traffic redirected by the VNF edges 22-1 and 22-2 is analyzed in the analysis device 21. The VNFs 22-0, 22-1, and 22-2 are edges for redirecting attack traffic, and are VNFs of an autoscaling target. In a case where the plurality of VNFs are collectively referred to without distinction therebetween, the plurality of VNFs will be simply referred to as a VNF 22. In addition, the number of VNFs 22 is not limited to a number illustrated in FIG. 1.

In the present embodiment, an example in which the VNFs 22-0 and 22-1 are built in advance in the traffic analysis NW 20 and the VNF 22-2 is newly added by the VIM 60 under management of the resource management device 40 will be described.

The flow collector 30 collects traffic of the NW edges 12-1 to 12-N. For example, the flow collector 30 periodically collects traffic. Alternatively, the flow collector 30 may collect traffic in accordance with a predetermined policy.

The resource management device 40 notifies the NFVO 50 of an increased resource amount and an addition instruction of the VNF based on an increase in traffic of the NW edges 12-1 to 12-N collected by the flow collector 30. In addition, the resource management device 40 decides on the VNF (for example, the VNFs 22-0, 22-1, and 22-2) which becomes a redirection destination of the traffic of the NW edges 12-1 to 12-N in response to the execution of the addition of the VNF (for example, the VNF 22-2) by the NFVO 50.

The NFVO 50 instructs the VIM 60 to add a resource of the VNF in response to the notification from the resource management device 40. The NFVO 50 stores the maximum resource amount and a vacant resource amount for each VNF of the autoscaling target.

The VIM 60 adds the VNF (for example, the VNF 22-2) in accordance with the instruction from the NFVO 50.

The flow controller 70 instructs the NW edges 12-1 to 12-N to set the VNF (for example, the VNFs 22-1 and 22-2) decided by the resource management device 40 as a redirection destination of traffic.

In the communication system 1 according to the embodiment, the resource management device 40 that collects traffic data from the flow collector 30 and provides an autoscaling amount and the addition instruction of the VNF to the NFVO 50 is newly included. In addition, in the communication system 1, before traffic is redirected to the VNF 22-1, the resource management device 40 builds the VNF to which an optimal resource amount is allocated by acquiring the input traffic amount on a path before traffic is redirected to the VNF 22-1 of the autoscaling target. Next, a configuration of main devices of the communication system 1 will be described.

Flow Collector

Figure 2:
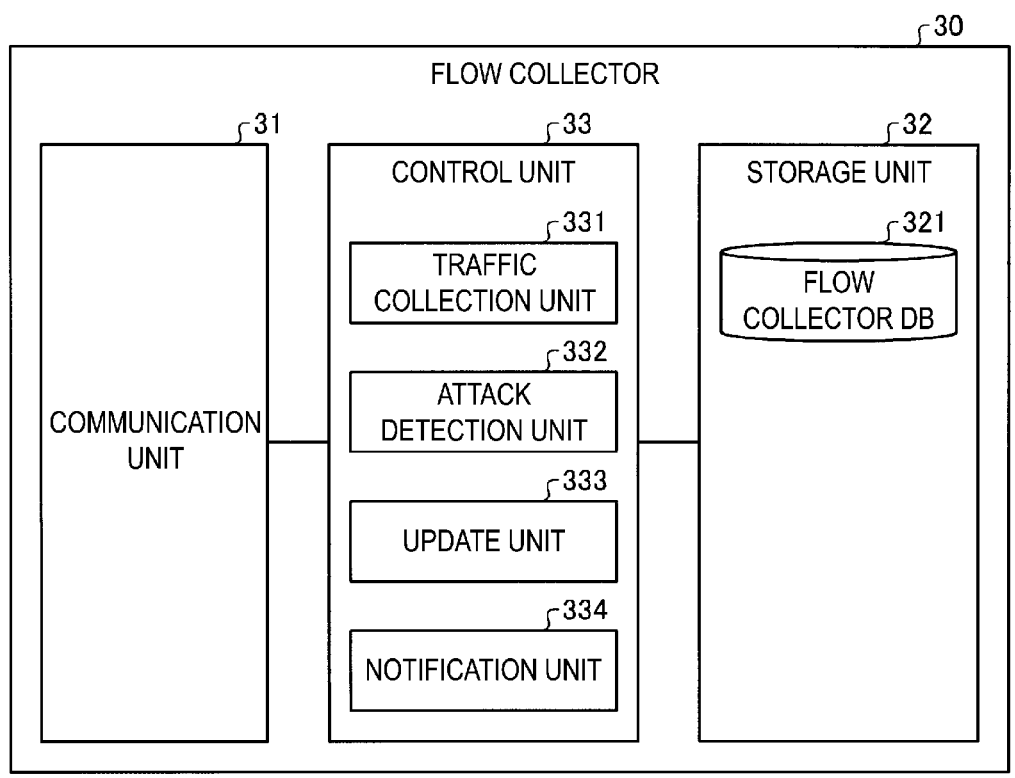
FIG. 2 is a diagram illustrating an example of a configuration of a flow collector illustrated in FIG. 1.

First, a configuration of the flow collector 30 will be described. FIG. 2 is a diagram illustrating an example of the configuration of the flow collector 30 illustrated in FIG. 1.

As illustrated in FIG. 2, the flow collector 30 includes a communication unit 31, a storage unit 32, and a control unit 33.

The communication unit 31 is a communication interface that transmits and receives various information to and from another device connected through the network or the like. The communication unit 31 is implemented by a network interface card (NIC) or the like and performs communication between the other device and the control unit 33 (described later) through an electric communication circuit such as a local area network (LAN) or the Internet. For example, the communication unit 31 collects traffic of the NW edges 12-1 to 12-N through the network. The communication unit 31 notifies the resource management device 40 of data related to the collected traffic through the network.

The storage unit 32 is implemented by a semiconductor memory element such as a random access memory (RAM) or a flash memory, or a storage device such as a hard disk or an optical disk and stores a processing program operating the flow collector 30, data used during execution of the processing program, or the like. The storage unit 32 includes a flow collector database (DB) 321.

The flow collector DB 321 stores the traffic data related to the traffic collected from the NW edges 12-1 to 12-N. FIG. 3 is a diagram showing an example of a data configuration of the traffic data stored in the flow collector DB 321.

As shown in FIG. 3, traffic data L3 is data that associates a transmission source IP address, a recipient IP address, a transmission source MAC address, a recipient MAC address, a protocol number, a traffic amount, a number indicating how large the traffic is in rank, and identification information of a redirection VNF for each traffic. For example, the traffic data L3 shows that traffic that is the largest traffic and has a transmission source IP address of "X1", a recipient IP address of "Y1", a transmission source MAC address of "X1a", a recipient MAC address of "Y1a", a protocol number of "Z1", and a traffic amount of "800" is redirected to the VNF 22-1.

The control unit 33 controls the whole flow collector 30. The control unit 33 includes an internal memory for storing a program and necessary data defining various processing procedures or the like, and executes various processes using the program and the data. For example, the control unit 33 is an electronic circuit such as a central processing unit (CPU) or a micro processing unit (MPU). In addition, the control unit 33 functions as various processing units by operation of various programs. The control unit 33 includes a traffic collection unit 331, an attack detection unit 332, an update unit 333, and a notification unit 334.

The traffic collection unit 331 collects traffic of each of the NW edges 12-1 to 12-N through the communication unit 31 and the network. For example, the traffic collection unit 331 periodically collects traffic.

The attack detection unit 332 detects the presence or absence of an attack based on the traffic collected by the traffic collection unit 331. For example, in a case where traffic of one CPE 11-1 is rapidly increased, the attack detection unit 332 detects the presence of an attack from the CPE 11-1.

The update unit 333 updates the traffic data of the flow collector DB 321 based on the traffic collected by the traffic collection unit 331. The notification unit 334 notifies the resource management device 40 of the traffic data of the flow collector DB 321.

Resource Management Device

Figure 4:
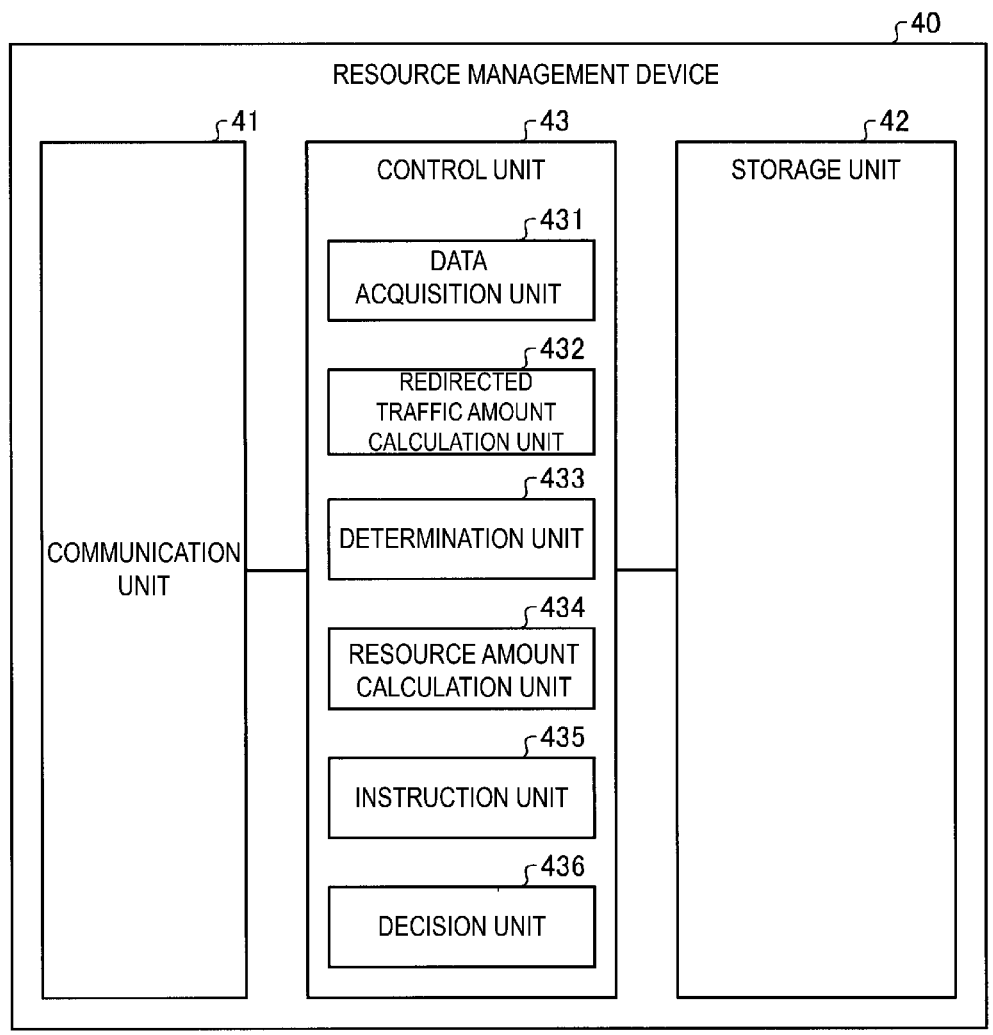
FIG. 4 is a diagram illustrating an example of a configuration of a resource management device illustrated in FIG. 1.

Next, a configuration of the resource management device 40 will be described. FIG. 4 is a diagram illustrating an example of the configuration of the resource management device 40 illustrated in FIG. 1. As illustrated in FIG. 4, the resource management device 40 includes a communication unit 41, a storage unit 42, and a control unit 43.

The communication unit 41 is a communication interface that transmits and receives various information to and from another device connected through the network or the like in the same manner as the communication unit 31. For example, the communication unit 41 communicates with the flow collector 30, the NFVO 50, and the flow controller 70 through the network.

The storage unit 42 is implemented by a semiconductor memory element such as a RAM or a flash memory, or a storage device such as a hard disk or an optical disk and stores a processing program operating the resource management device 40, data used during the execution of the processing program, or the like.

The control unit 43 controls the whole resource management device 40. The control unit 43 includes an internal memory for storing a program and necessary data defining various processing procedures or the like, and executes various processes using the program and the data. For example, the control unit 43 is an electronic circuit such as a CPU. In addition, the control unit 43 functions as various processing units by operation of various programs. The control unit 43 includes a data acquisition unit 431, a redirected traffic amount calculation unit 432, a determination unit 433, a resource amount calculation unit 434, an instruction unit 435, and a decision unit 436.

The data acquisition unit 431 acquires various information from another device by communicating with the other device through the communication unit 41 and the network. Specifically, the data acquisition unit 431 acquires information of the flow collector DB 321 from the flow collector 30. In this case, the data acquisition unit 431 acquires the traffic data shown in FIG. 3. In addition, the data acquisition unit 431 acquires the maximum resource amount and the vacant resource amount of each VNF from the NFVO 50.

The redirected traffic amount calculation unit 432 calculates a redirected traffic amount Ni to be redirected to each VNF based on the traffic data acquired by the data acquisition unit 431. An index indicating the VNF is denoted by i. In the traffic data shown in FIG. 3, the VNF 22-0 and the VNF 22-1 are shown as a redirection VNF. The redirected traffic amount calculation unit 432 calculates the redirected traffic amount N0 of the VNF 22-0 to be 100 based on a traffic amount of "100" of a second row in which the VNF 22-0 is shown as the redirection VNF in the traffic data shown in FIG. 3. In addition, the redirected traffic amount calculation unit 432 calculates the sum of the traffic amounts "800", "400", and "500" of the first, third, and fourth rows in which the VNF 22-1 is shown in the traffic data shown in FIG. 3. Consequently, the redirected traffic amount calculation unit 432 calculates the redirected traffic amount N1 of the VNF 22-1 to be "1700".

The determination unit 433 determines whether or not a resource of each VNF is sufficient for the inflow of traffic from the NW edges 12-1 to 12-N. For each VNF, the determination unit 433 compares magnitudes of the redirected traffic amount Ni of each VNF calculated by the redirected traffic amount calculation unit 432 and a maximum resource amount Ri of each VNF acquired from the NFVO 50. The determination unit 433 determines whether or not $N_i \leq R_i$ is satisfied.

Specifically, for the VNF for which it is determined that $N_i \square R_i$ is satisfied, the determination unit 433 determines that the resource of the VNF is sufficient for the inflow of traffic. Meanwhile, for the VNF for which it is determined that Ni☐Ri is not satisfied, that is, Ni>Ri is satisfied, the determination unit 433 determines that the resource of the VNF is not sufficient for the inflow of traffic. For example, N0<R0 is satisfied in a case where the redirected traffic amount calculation unit 432 calculates the redirected traffic amount N0 of the VNF 22-0 to be 100 and the maximum resource amount R0 of the VNF 22-0 is 400. Thus, the determination unit 433 determines that the resource of the VNF 22-0 is sufficient. Meanwhile, N1>R1 is satisfied in a case where the redirected traffic amount calculation unit 432 calculates the redirected traffic amount N1 of the VNF 22-1 to be 1700 and the maximum resource amount R1 of the VNF 22-1 is 400. Thus, the determination unit 433 determines that the resource of the VNF 22-1 is not sufficient.

In a case where the VNF of which the resource is determined to be not sufficient by the determination unit 433 is present, the resource amount calculation unit 434 calculates the resource amount of the added VNF. For example, in a case where the redirected traffic amount N1 of the VNF 22-1 is 1700 and the maximum resource amount R1 of the VNF 22-1 is 400, the resource amount of the added VNF is calculated to be 1300.

The instruction unit 435 decides a VNF method based on a calculation result of the resource amount calculation unit 434 and notifies the NFVO 50 of a VNF resource addition instruction. For example, as an addition method, a method of adding one VNF to which a resource amount capable of dealing with the insufficient amount is allocated is present. In addition, as the addition method, a method of adding a plurality of VNFs to which resource amounts capable of dealing with the insufficient amount are allocated is present. In addition, as the addition method, a method of adding the plurality of VNFs to which the resource amounts capable of dealing with the insufficient amount are allocated in a distributed manner in a plurality of data centers is present.

The decision unit 435 decides on the VNF which becomes the redirection destination of the traffic of the NW edges 12-1 to 12-N in response to a notification of the execution of VNF addition by the NFVO 50 and notifies the flow controller 70 of the decided VNF. For example, in a case where the VNF 22-2 is added, it is decided that the redirection destination of traffic having transmission source IP addresses of "X1", "X3", and "X4" in the traffic of the NW edges 12-1 to 12-N is distributed to the VNF 22-1 and the VNF 22-2.

NFVO

Figure 5:
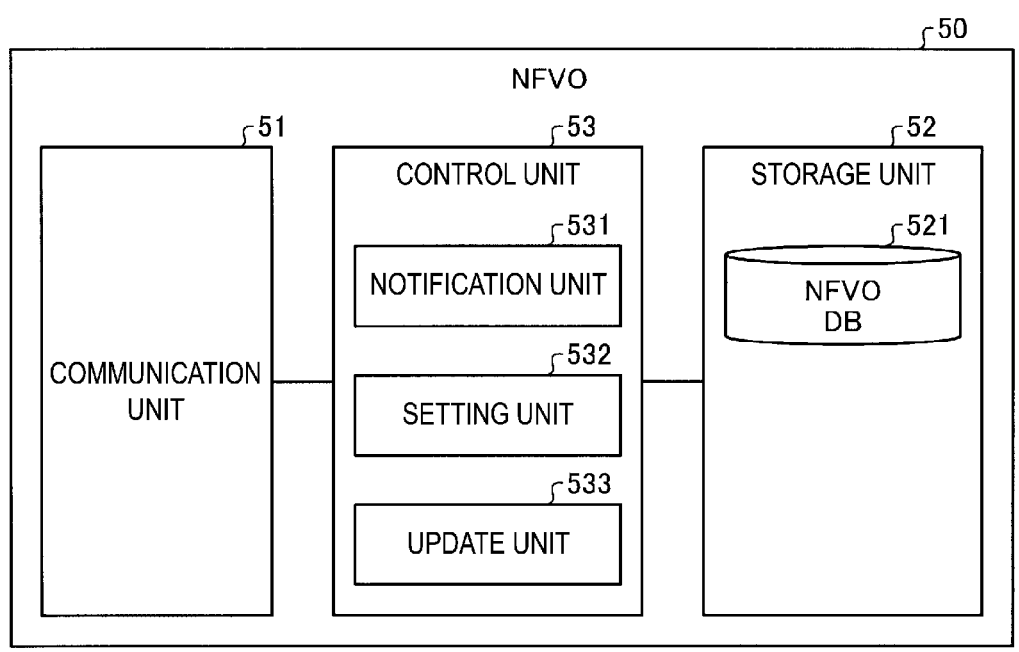
FIG. 5 is a diagram illustrating an example of a configuration of an NFVO illustrated in FIG. 1.

Next, a configuration of the NFVO 50 will be described. FIG. 5 is a diagram illustrating an example of the configuration of the NFVO 50 illustrated in FIG. 1. As illustrated in FIG. 5, the NFVO 50 includes a communication unit 51, a storage unit 52, and a control unit 53.

The communication unit 51 is a communication interface that transmits and receives various information to and from another device connected through the network or the like in the same manner as the communication units 31 and 41. For example, the communication unit 51 communicates with the resource management device 40 and the VIM 60 through the network.

The storage unit 52 is implemented by a semiconductor memory element such as a RAM or a flash memory, or a storage device such as a hard disk or an optical disk and stores a processing program operating the NFVO 50, data used during the execution of the processing program, or the like. The storage unit 52 includes an NFVO DB 521.

The NFVO DB 521 stores resource data that shows the maximum resource amount and the vacant resource amount of each VNF. FIG. 6 is a diagram showing one example of a data configuration of the resource data stored in the NFVO DB 521 illustrated in FIG. 5. Resource data L5 shown in FIG. 6 is data before the addition of the VNF 22-2.

As shown in FIG. 6, the resource data L5 is data that associates the maximum resource amount (Ri), the input traffic amount at a certain point in time, and the vacant resource amount for each VNF. For example, for the VNF 22-0, the resource data L5 shows that the maximum resource amount R0 is 400, the input traffic amount at a certain point in time is 300, and the vacant resource amount is 100. In addition, for example, for the VNF 22-1, the resource data L5 shows that the maximum resource amount R1 is 400, the input traffic amount at a certain point in time is 200, and the vacant resource amount is 200. The number of VNFs shown in the resource data L5 may be any number. In addition, the resource data L5 is data before the occurrence of a rapid increase in traffic.

The control unit 53 controls the whole NFVO 50. The control unit 53 includes an internal memory for storing a program and necessary data defining various processing procedures or the like, and executes various processes using the program and the data. For example, the control unit 53 is an electronic circuit such as a CPU. In addition, the control unit 53 functions as various processing units by operation of various programs. The control unit 53 includes a notification unit 531, a setting unit 532, and an update unit 533.

The notification unit 531 notifies the resource management device 40 of the maximum resource amount, the input traffic amount, and the vacant resource amount of each VNF.

The setting unit 532 receives the notification of the VNF resource addition instruction from the resource management device 40, sets the addition of the resource of the target VNF 22-2, and instructs the VIM 60 to add the VNF 22-2.

The update unit 533 updates data of the NFVO DB 521 in association with the newly added VNF 22-2 in a case where the execution of the addition of the VNF 22-2 from the VIM 60 is completed. Specifically, the update unit 533 adds data of the maximum resource amount, the input traffic amount, and the vacant resource amount of the VNF 22-2 to the resource data.

In the present embodiment, traffic of the VNFs 22-0 to 22-2 is monitored by the resource management device 40 through the flow collector 30. Alternatively, the NFVO 50 may have a function of monitoring the traffic of the VNF 22-0 to 22-2 in the same manner as the related art.

In addition, the flow collector 30, the resource management device 40, the NFVO 50, the VIM 60, and the flow controller 70 have been described as a physical server device but are not limited thereto. The flow collector 30, the resource management device 40, the NFVO 50, the VIM 60, and the flow controller 70 may be virtual machines loaded by a physical server device. In addition, these devices may be built at the same location or may be built in a distributed manner on the network.

Flow of VNF Addition

Figure 7:
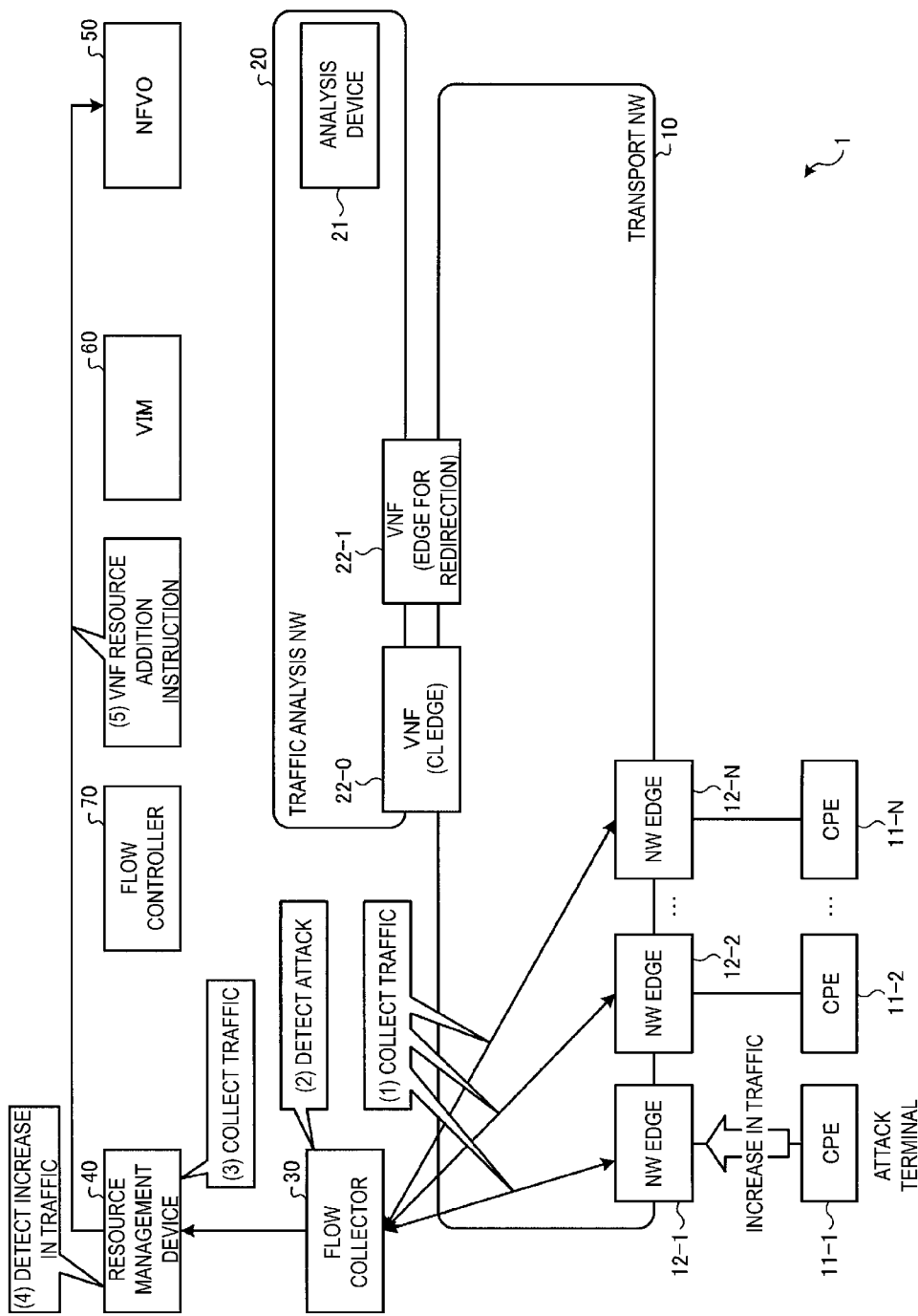
FIG. 7 is a diagram describing a process flow of VNF addition in the communication system illustrated in FIG. 1.
Figure 8:
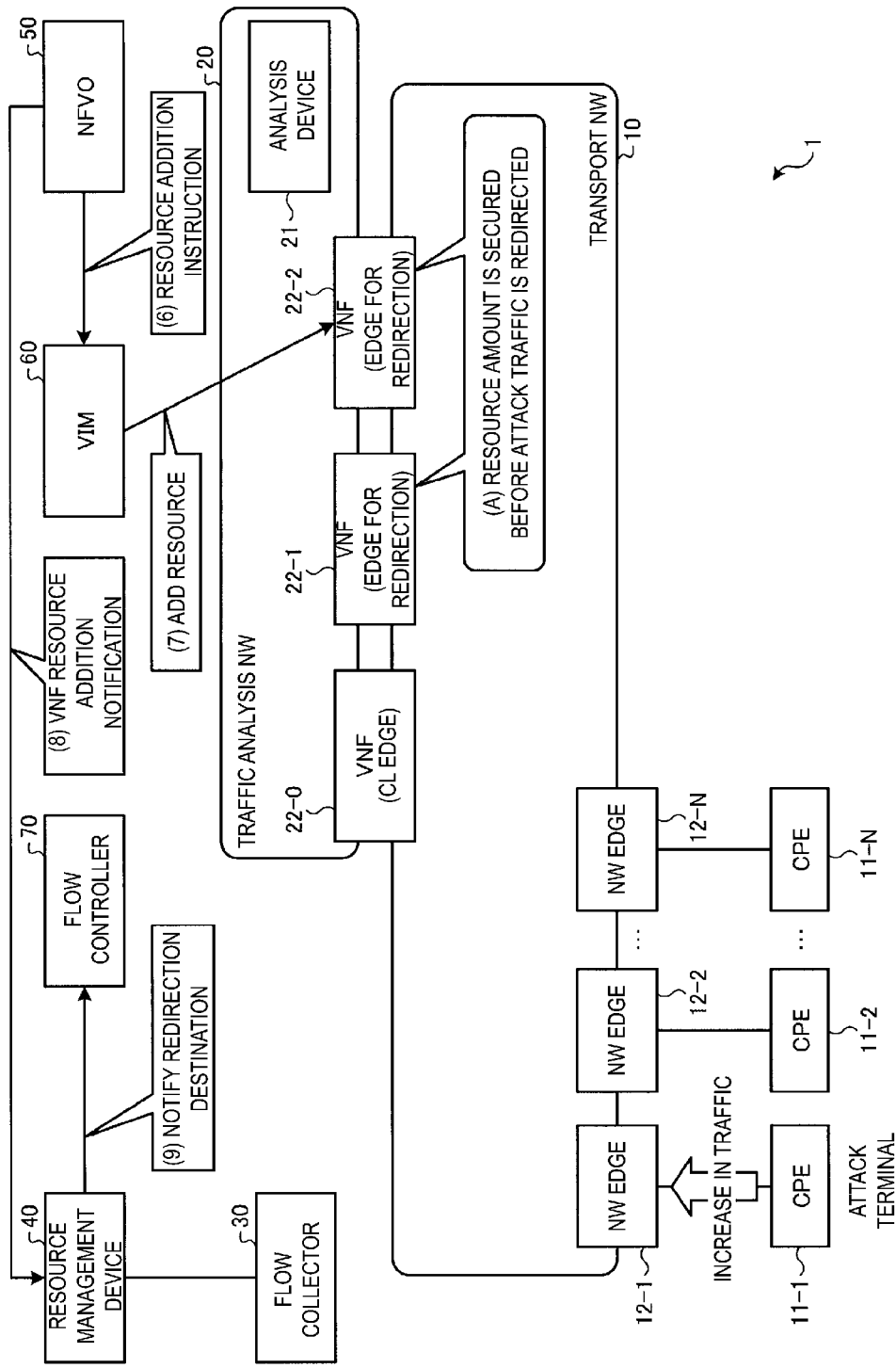
FIG. 8 is a diagram describing a process flow of VNF addition in the communication system illustrated in FIG. 1.
Figure 10:
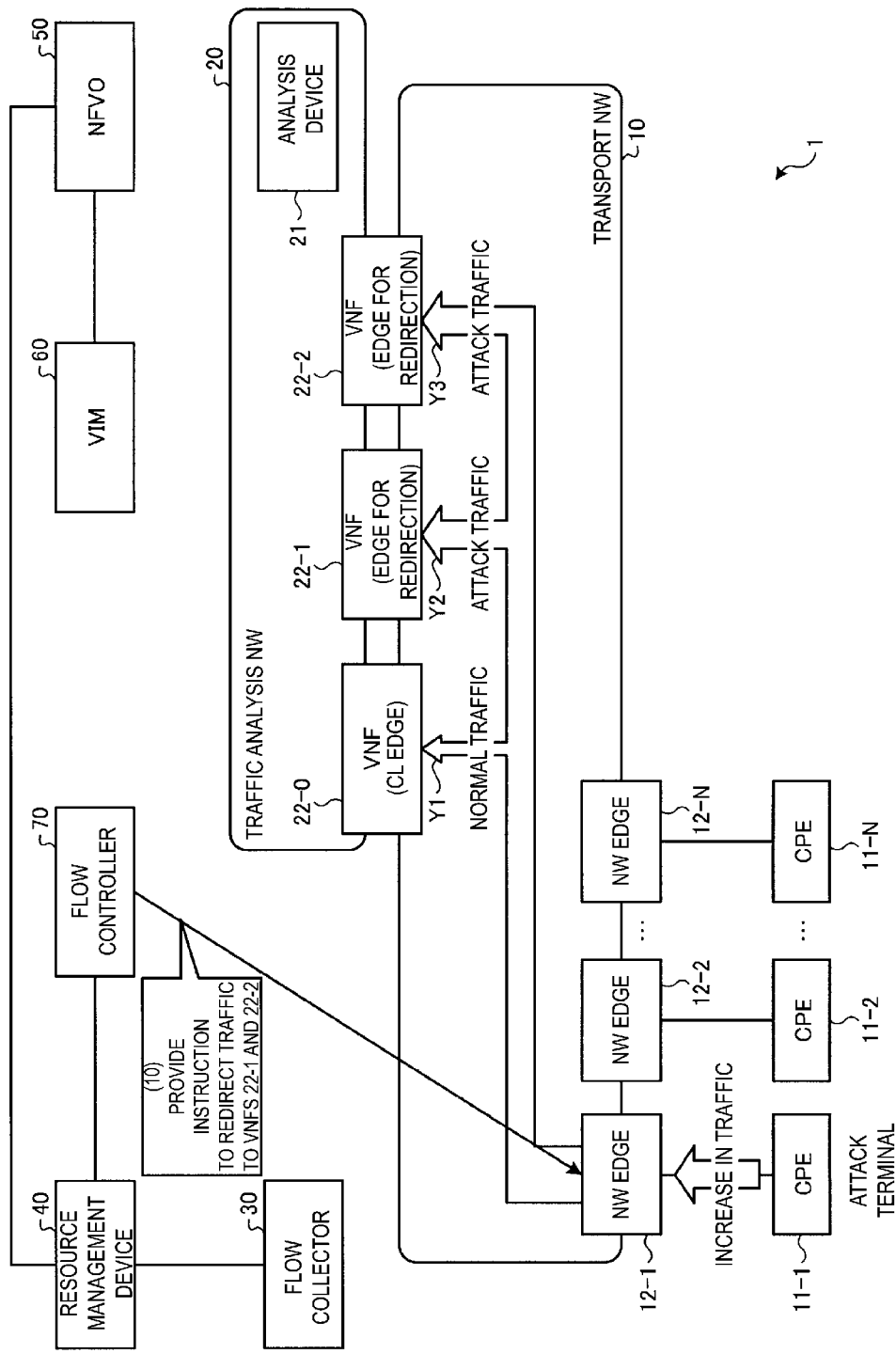
FIG. 10 is a diagram describing a process flow of VNF addition in the communication system illustrated in FIG. 1.

Next, a process flow of VNF addition in the communication system 1 illustrated in FIG. 1 will be described. FIG. 7, FIG. 8, and FIG. 10 are diagrams describing the process flow of VNF addition in the communication system 1 illustrated in FIG. 1. FIG. 9 is a diagram showing the update of the resource data by the NFVO 50 illustrated in FIG. 1.

As illustrated in FIG. 7, first, the flow collector 30 collects the traffic of the NW edges 12-1 to 12-N (refer to (1) of FIG. 7). In a case where the flow collector 30 detects an attack of the CPE 11-1 based on a rapid increase in traffic from the CPE 11-1 that is an attack terminal (refer to (2) of FIG. 7), the flow collector 30 notifies the resource management device 40 of the collected traffic data (refer to (3) of FIG. 7).

In a case where the resource management device 40 detects an increase in traffic from the traffic data (refer to (4) of FIG. 7), the resource management device 40 notifies the NFVO 50 of the increased resource amount and the VNF resource addition instruction which is an instruction to add the VNF (refer to (5) of FIG. 7). In this case, the resource management device 40 provides an instruction to newly add the VNF 22-2.

The NFVO 50 receives the notification from the resource management device 40 and provides a resource addition instruction to the VIM 60 (refer to (6) of FIG. 8). The VIM 60 adds (adds the resource of) the VNF 22-2 in accordance with the instruction from the NFVO 50 (refer to (7) of FIG. 8). Consequently, the resource amount for traffic redirection is secured before the attack traffic of the CPE 11-1 which is the attack terminal is redirected to the target VNF (refer to (A) of FIG. 8). In addition, the NFVO 50 updates the stored resource data from the resource data L5 (refer to FIG. 9) to resource data L51 (refer to FIG. 9). In the resource data L51, a maximum resource of "400", an input traffic amount of "0", and a vacant resource amount of "400" are added in association with the identification information of the newly added VNF 22-2.

Next, the NFVO 50 notifies the resource management device 40 of a VNF resource addition notification indicating the completion of the addition of the VNF 22-2 and the maximum resource amount of the target VNF (refer to (8) of FIG. 8). The resource management device 40 receives the VNF resource addition notification, decides on the VNF which becomes a redirection destination of the traffic of the NW edge 12-1 accommodating the CPE 11-1, and notifies the flow controller 70 of the VNF (refer to (9) of FIG. 8). For example, the resource management device 40 decides on the VNFs 22-1 and 22-2 which become the redirection destination of the traffic of the NW edge 12-1.

The flow controller 70 instructs the NW edge 12-1 to redirect the attack traffic to the VNFs 22-1 and 22-2 (refer to (10) of FIG. 10). Thus, a traffic identification process in which the VNF 22-0 redirects the normal traffic (refer to arrow Y1 in FIG. 10) and the VNFs 22-1 and 22-2 redirect the attack traffic (refer to arrows Y2 and Y3 in FIG. 10) in the traffic flowing from the NW edge 12-1 is performed.

Processing Procedure of Communication Process

Figure 11:
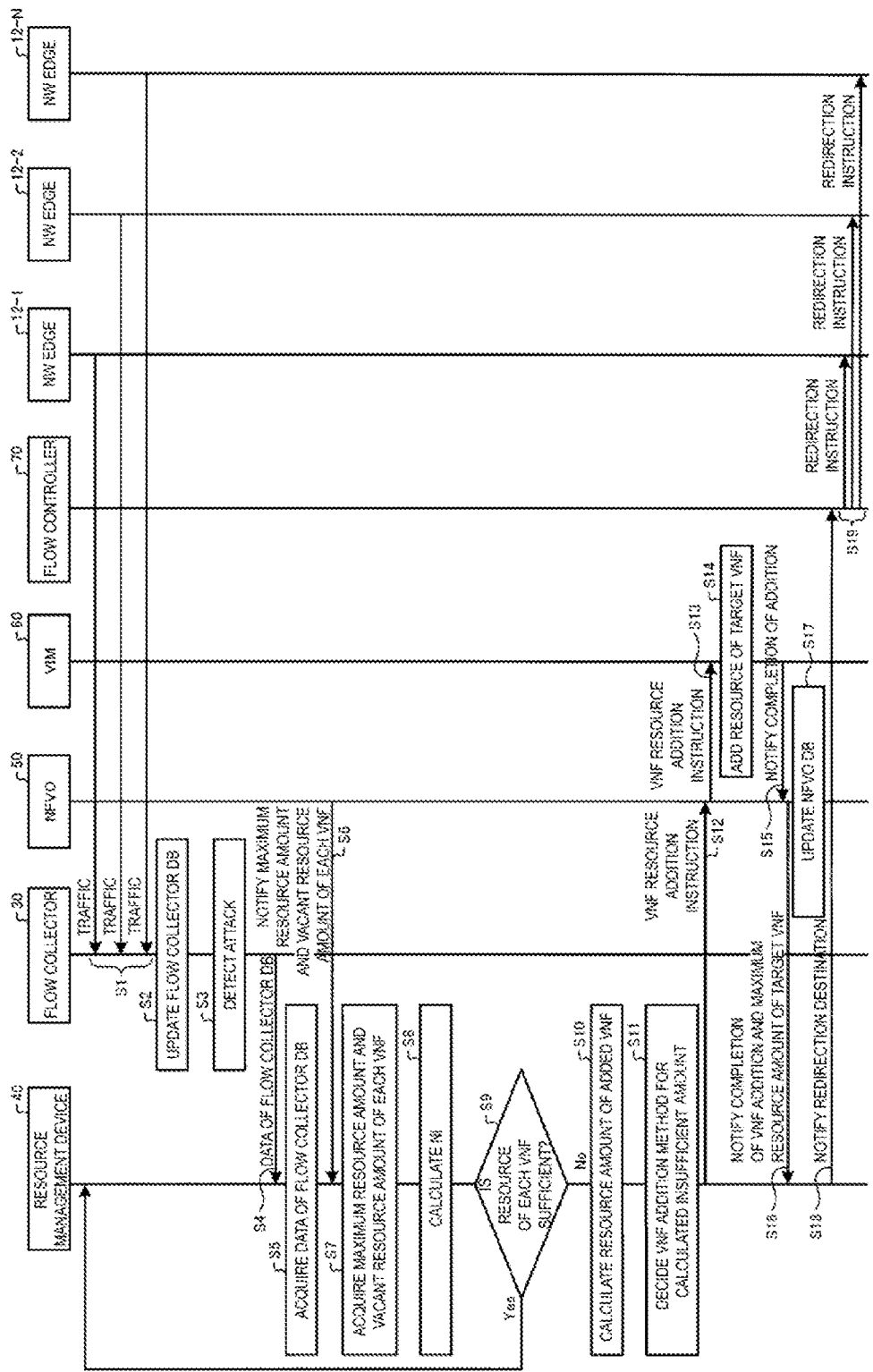
FIG. 11 is a sequence diagram illustrating a processing procedure of a communication process in the communication system illustrated in FIG. 1.

FIG. 11 is a sequence diagram illustrating a processing procedure of a communication process in the communication system 1 illustrated in FIG. 1. As illustrated in FIG. 11, first, the flow collector 30 collects the traffic of the NW edges 12-1 to 12-N (step S1) and updates the traffic data of the flow collector DB 321 based on the collected traffic (step S2). In a case where the flow collector 30 detects the attack of the attack terminal (step S3), the flow collector 30 notifies the resource management device 40 of the traffic data of the flow collector DB 321 (step S4).

The resource management device 40 acquires the traffic data of the flow collector DB 321 (step S5), receives the notification of the maximum resource amount and the vacant resource amount of each VNF from the NFVO 50 (step S6), and acquires the maximum resource amount and the vacant resource amount of each VNF (step S7).

Next, the resource management device 40 calculates the redirected traffic amount Ni to be redirected to each VNF based on the acquired traffic data (step S8), respectively. The resource management device 40 determines whether or not the resource of each VNF is sufficient (step S9). Specifically, the resource management device 40 determines whether or not Ni□Ri is satisfied for each VNF.

In a case where the resource management device 40 determines that Ni □Ri is satisfied for each VNF (step S9: Yes), the VNF is not added. In the communication system 1, a return is made to step S1, and the traffic of each of the NW edges 12-1 to 12-N is collected again. It is considered that the resources of all VNFs are sufficient for the inflow of traffic.

In a case where the resource management device 40 determines that a VNF for which Ni □Ri is not satisfied is present (step S9: No), the resource management device 40 calculates the resource amount of the added VNF (step S10). The resource management device 40 decides a VNF addition method for the insufficient amount with respect to the calculated resource amount (step S11). The resource management device 40 notifies the NFVO 50 of the increased resource amount and the VNF resource addition instruction which is the instruction to add the VNF (step S12).

The NFVO 50 receives the notification from the resource management device 40 and provides the resource addition instruction to the VIM 60 (step S13). The VIM 60 adds the target VNF in accordance with the instruction from the NFVO 50 (step S14). For example, the VIM 60 adds the VNF 22-2.

In a case where the NFVO 50 receives the notification of the completion of the addition of the target VNF from the VIM 60 (step S15), the NFVO 50 notifies the resource management device 40 of the completion of the VNF addition and the maximum resource amount of the resource of the target VNF (step S16). For example, the NFVO 50 notifies the resource management device 40 of the completion of the addition of the VNF 22-2 and the maximum resource amount R2 of the VNF 22-2. The NFVO 50 updates the resource data of the NFVO DB 521 in association with the VNF 22-2 (step S17).

The resource management device 40 decides on the VNF 22 which becomes the redirection destination of the traffic of the NW edges 12-1 to 12-N in response to the notification of the execution of the VNF addition by the NFVO 50 and notifies the flow controller 70 of the VNF 22 of the redirection destination (step S18). The flow controller 70 instructs each NW edge 12 to set the redirection destination (step S19).

Effect of Embodiment

In the communication system 1 according to the present embodiment, the resource management device 40 that collects the traffic data from the flow collector 30 and provides the autoscaling amount and the addition instruction of the VNF to the NFVO 50 is newly disposed.

In addition, in the communication system 1, before traffic is redirected to the VNF 22-1, the resource management device 40 builds the VNF 22-2 to which the optimal resource amount is allocated by acquiring the input traffic amount on the path before traffic is redirected to the VNF 22-1 of the autoscaling target. In other words, in the communication system 1, the resource amount for traffic redirection is secured before the attack traffic of the CPE 11-1 which is the attack terminal is redirected to the target VNF 22.

Thus, in the communication system 1 according to the present embodiment, even in a case where a rapid increase in traffic occurs in a small amount of time, the new VNF 22 to which the optimal resource amount is allocated can be added before traffic is redirected to the VNF 22 of the autoscaling target. Thus, according to the present embodiment, the VNF 22 to which the optimal NW resource amount is allocated can be efficiently built depending on an increase in traffic amount flowing into the NW.

Modification Example 1

The resource management device 40 may cause test traffic to flow to the VNF 22 at a timing at which the new VNF 22 (for example, the VNF 22-2) is added, check traffic communication of the VNF 22 in advance, and verify the reliability of the added VNF 22.

Modification Example 2

The resource management device 40 may instruct the NFVO 50 to not only add the VNF 22 but also remove the VNF 22. In this case, the resource management device 40 notifies the NFVO 50 of a VNF resource removal instruction in a case where the traffic amount of the NW edge 12 collected by the flow collector 30 is below a predetermined percentage of the maximum resource amount of the VNF 22.

For example, the resource management device 40 instructs the NFVO 50 to remove the VNF 22-2 in a case where the traffic amount of the NW edge 12 collected by the flow collector 30 is below 10 percent of the maximum resource amount of the VNF 22. The NFVO 50 receives this instruction and causes the VIM 60 to remove the VNF 22-2. In response to the removal of the VNF 22, the resource management device 40 changes the VNF 22 as the redirection destination of the traffic of the NW edge 12 and notifies the flow controller 70 of details of the change.

The resource management device 40 notifies the NFVO 50 of an increased or decreased resource amount and an addition or removal instruction of the VNF 22 based on an increase or decrease of the traffic of the edge device collected by the flow collector 30, and decides on the VNF 22 which becomes the redirection destination of the traffic of the NW edge 12 in response to the execution of the addition of the VNF 22 or the removal of the VNF 22 by the NFVO 50. Thus, according to Modification Example 2, the VNF 22 to which the optimal NW resource amount is allocated can be efficiently built depending on a change of the traffic amount flowing into the NW. Thus, according to Modification Example 2, dynamic autoscaling in which traffic redirection control and the addition and removal of the VNF 22 are interconnected can be efficiently performed.

Modification Example 3

The NFVO 50 may store the maximum resource amount of each VNF 22 and the input traffic amount and the vacant resource amount that are acquired in time series. In other words, the NFVO 50 may store the resource data that shows the past traffic amount in time series. The NFVO 50 acquires the traffic data collected by the flow collector 30 at a plurality of points in time in the past. The NFVO 50 stores the maximum resource amount (Ri) and the input traffic amount and the vacant resource amount at a certain point in time in association with a collection time for each VNF.

FIG. 12 is a diagram showing an example of a data configuration of the resource data stored in the NFVO 50 illustrated in FIG. 1. Resource data L5-1 shown in FIG. 12 associates the maximum resource amount (Ri) of each of the VNFs 22-0, 22-1, and 22-2 and the input traffic amount and the vacant resource amount at a certain point in time with each of times T1, T2, and T3 at which the traffic is collected.

The resource management device 40 notifies the NFVO 50 of the VNF resource addition instruction in a case where the input traffic amount in a predetermined period exceeds a predetermined percentage of the maximum resource amount of the corresponding VNF 22. For example, the resource management device 40 instructs the NFVO 50 to add the VNF 22 in a case where the input traffic amount at times T1 to T3 exceeds 80 percent of the maximum resource amount of the corresponding VNF.

In addition, the resource management device 40 notifies the NFVO 50 of the VNF resource removal instruction in a case where the input traffic amount in a predetermined period is below a predetermined percentage of the maximum resource amount. For example, the resource management device 40 instructs the NFVO 50 to remove the VNF 22 in a case where the input traffic amount at times T1 to T3 is below 10 percent of the maximum resource amount of the corresponding VNF 22.

The resource management device 40 may reduce the number of times of addition or removal by determining whether to add or remove the VNF 22 based on the traffic amount at a plurality of points in time as in Modification Example 3, thereby reducing loads of the NFVO 50 and the VIM 60.

Modification Example 4

The resource management device 40 may have a function of recognizing the number of licenses necessary for adding the VNF 22 in a case where the VNF 22 is a commercially available product. In this case, the resource management device 40 additionally purchases an application license as necessary in a case where the number of licenses is insufficient with only the possessed licenses. That is, the resource management device 40 has a function of ordering a necessary number of licenses in cooperation with a seller of the VNF 22. Thus, the resource management device 40 can smoothly add the VNF 22. In addition, the upper limit of the amount of money for the purchase may be further set in the resource management device 40, and the upper limit of the number of orders may be determined.

Modification Example 5

The present embodiment can also be applied to a case where the VNF has a multistage configuration. For example, such a case includes a multistage configuration in which the VNF in a front stage is a virtual router and the VNF in a rear stage is a virtual server for service provision. In this case, the resource management device 40 notifies the NFVO 50 of the increased or decreased resource amount and the addition or removal instruction of the VNF for each of the virtual router and the virtual server for service provision.

Specifically, a case where the VNF is a virtual router product and the VNF for service provision is present inside the virtual router product will be described. For example, the VNF 22-0 (CL edge), illustrated in FIG. 1, that is a data center gateway (DCGW) is the virtual router, and the virtual server for service provision is also present inside the DC. In such a case, the resource management device 40 manages addition and removal of the virtual server for service provision in the same manner as the virtual router. Thus, according to Modification Example 5, both of a DCGW function and an application can be appropriately autoscaled at once.

System Configuration and Like

Each illustrated constituent of each device is a functional concept and is not required to be physically configured as illustrated. That is, a specific form of distribution and integration of each device is not limited to the illustration. The whole or a part of the specific form can be configured by functional or physical distribution and integration in any units depending on various loads, a usage status, or the like. Furthermore, the whole or a part of each processing function performed by each device may be implemented by a CPU and a program analyzed and executed by the CPU, or may be implemented as hardware based on a wired logic.

The whole or a part of the process described as being automatically performed among the processes described in the present embodiment can be manually performed, or the whole or a part of the process described as being manually performed can be automatically performed using a well-known method. Besides, information including a processing procedure, a control procedure, a specific name, and various data and parameters illustrated in the document and the drawings can be randomly changed unless otherwise specified.

Program

Figure 13:
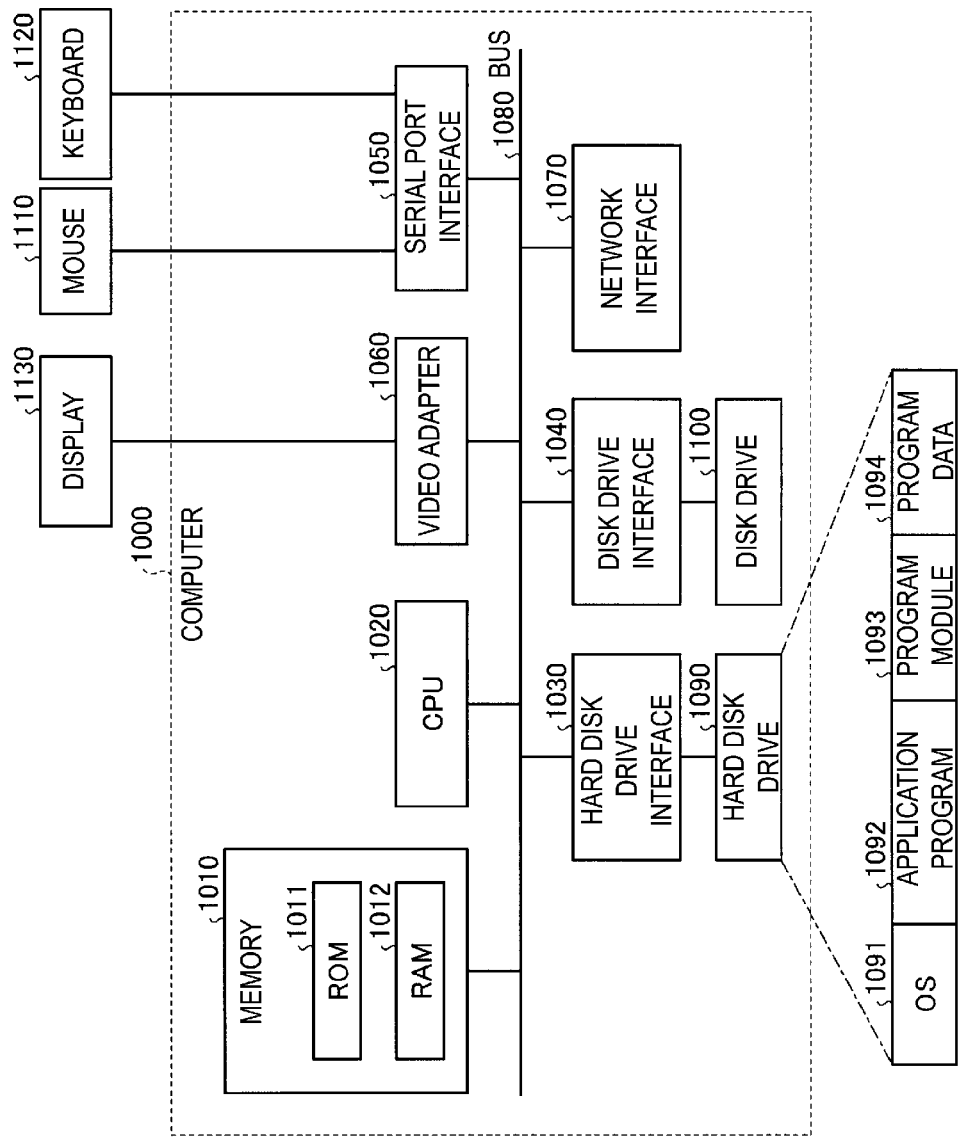
FIG. 13 is a diagram illustrating an example of a computer in which a flow collector, a resource management device, an NFVO, a VIM, and a flow controller are implemented by executing a program.
Figure 14:
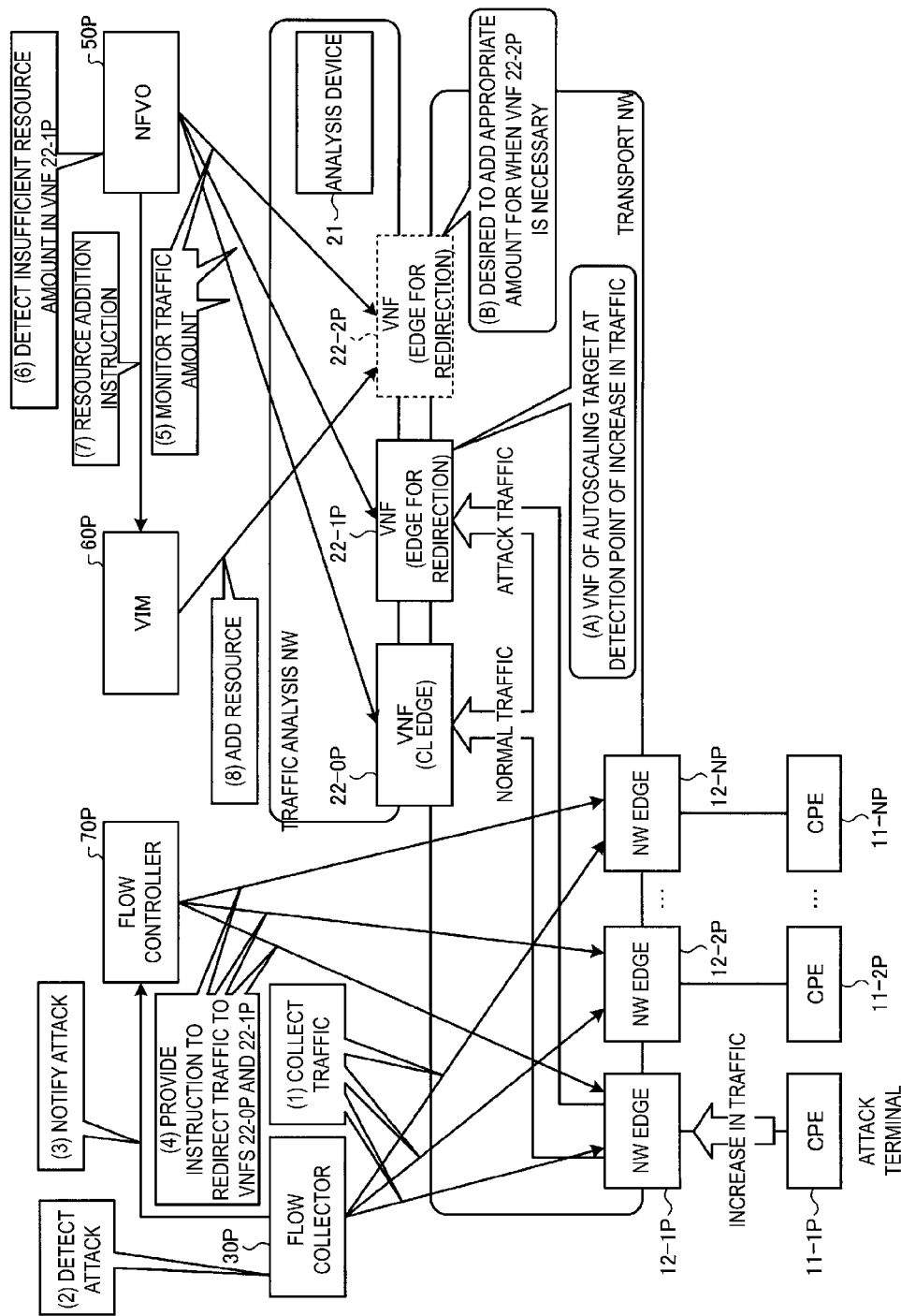
FIG. 14 is a diagram describing a flow of autoscaling of a VNF by an NFVO in a technology in the related art.

FIG. 13 is a diagram illustrating an example of a computer in which the flow collector 30, the resource management device 40, the NFVO 50, the VIM 60, and the flow controller 70 are implemented by executing a program. For example, a computer 1000 includes a memory 1010 and a CPU 1020. In addition, the computer 1000 includes a hard disk drive interface 1030, a disk drive interface 1040, a serial port interface 1050, a video adapter 1060, and a network interface 1070. These units are connected to each other through a bus 1080.

The memory 1010 includes a read only memory (ROM) 1011 and a RAM 1012. The ROM 1011 stores a boot program such as a basic input output system (BIOS). The hard disk drive interface 1030 is connected to a hard disk drive 1090. The disk drive interface 1040 is connected to a disk drive 1100. An attachable and detachable storage medium such as a magnetic disk or an optical disk is inserted into the disk drive 1100. For example, the serial port interface 1050 is connected to a mouse 1110 and a keyboard 1120. For example, the video adapter 1060 is connected to a display 1130.

For example, the hard disk drive 1090 stores an operating system (OS) 1091, an application program 1092, a program module 1093, and program data 1094. That is, the program defining each process of the flow collector 30, the resource management device 40, the NFVO 50, the VIM 60, and the flow controller 70 is implemented as the program module 1093 in which a code executable by the computer is described. For example, the program module 1093 is stored in the hard disk drive 1090. For example, the program module 1093 for executing the same processes as the functional configurations in the flow collector 30, the resource management device 40, the NFVO 50, the VIM 60, and the flow controller 70 is stored in the hard disk drive 1090. The hard disk drive 1090 may be replaced with a solid state drive (SSD).

In addition, for example, setting data that is used in the processes of the above embodiment is stored in the memory 1010 and the hard disk drive 1090 as the program data 1094. The CPU 1020 reads the program module 1093 and the program data 1094 stored in the memory 1010 and the hard disk drive 1090 into the RAM 1012 and executes the program module 1093 and the program data 1094 as necessary.

The program module 1093 and the program data 1994 are not limited to a case where the program module 1093 and the program data 1094 are stored in the hard disk drive 1090. For example, the program module 1093 and the program data 1094 may be stored in an attachable and detachable storage medium and be read by the CPU 1020 through the disk drive 1100 or the like. Alternatively, the program module 1093 and the program data 1094 may be stored in another computer connected through a network (a LAN, a wide area network (WAN), or the like). The program module 1093 and the program data 1094 may be read from the other computer by the CPU 1020 through the network interface 1070.

While the embodiment to which the disclosure conceived by the present inventors is applied has been described thus far, the present disclosure is not limited to the description and the drawing of the present embodiment that form a part of the disclosure of the present disclosure. That is, all other embodiments, examples, operation technologies, or the like conceived by those skilled in the art based on the present embodiment are also included in the scope of the present disclosure.

The invention claimed is:

1. A communication system comprising:
a flow collector that collects traffic of an edge device accommodating an edge terminal;
a network functions virtualization orchestrator (NFVO) that provides an instruction to add a resource of a virtual network function (VNF) or remove the resource;
a resource management device that notifies the NFVO of an increased or decreased resource amount and an addition or removal instruction of the VNF based on an increase or decrease of the traffic of the edge device collected by the flow collector, and that decides on the VNF as a redirection destination of the traffic of the edge device in response to execution of an addition of the VNF or a removal of the VNF by the NFVO;
a virtual infrastructure management (VIM) that adds or removes the VNF in accordance with an instruction from the NFVO; and
a flow controller that instructs the edge device to set the VNF decided by the resource management device as the redirection destination of the traffic.

2. The communication system according to claim 1, wherein the NFVO stores i) a maximum resource amount of each of the VNFs and ii) an input traffic amount and a vacant resource amount acquired in time series; and
wherein the resource management device notifies the NFVO of a VNF resource addition instruction in a case where the input traffic amount in a predetermined period exceeds a predetermined percentage of the maximum resource amount, and notifies the NFVO of a VNF resource removal instruction in a case where the input traffic amount in a predetermined period is below a predetermined percentage of the maximum resource amount.

3. The communication system according to claim 1, wherein the resource management device causes test traffic to flow to the VNF at a timing at which the VNF is added and checks traffic communication of the VNF in advance.

4. The communication system according to claim 1, wherein the VNF has a multistage configuration in which a VNF in a front stage is a virtual router and a VNF in a rear stage is a virtual server for service provision; and
wherein the resource management device notifies the NFVO of the increased or decreased resource amount and the addition or removal instruction of the VNF for each of the virtual router and the virtual server for service provision.

5. A communication method comprising:

collecting, by a flow collector, traffic of an edge device accommodating an edge terminal;

notifying, by a resource management device, a network functions virtualization orchestrator (NFVO) of an increased or decreased resource amount and an addition or removal instruction of a virtual network function (VNF) based on an increase or decrease of the traffic of the edge device collected in the collecting;

providing, by the NFVO, an instruction to add a resource of the VNF or remove the resource based on i) the increased or decreased resource amount and ii) the addition or removal instruction of the VNF;

adding or removing the VNF by a virtual infrastructure management (VIM) in accordance with an instruction from the NFVO;

deciding, by the resource management device, on the VNF as a redirection destination of the traffic of the edge device in response to execution of addition of the VNF or removal of the VNF by the NFVO; and instructing, by a flow controller, the edge device to set the VNF as the redirection destination of the traffic.

* * * * *